(12) United States Patent
Ott

(10) Patent No.: US 12,553,508 B1
(45) Date of Patent: Feb. 17, 2026

(54) SELF-SEALING GEARS ASSEMBLY WITH ADAPTER

(71) Applicant: Textron Innovations Inc., Providence, RI (US)

(72) Inventor: Charles Jared Ott, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/807,753

(22) Filed: Aug. 16, 2024

(51) Int. Cl.
*F16H 57/029* (2012.01)
*F16H 57/04* (2010.01)

(52) U.S. Cl.
CPC ....... *F16H 57/029* (2013.01); *F16H 57/0456* (2013.01)

(58) Field of Classification Search
CPC .... F16H 57/029; F16H 57/0456; B64C 27/32
See application file for complete search history.

(56) References Cited

U.S. PATENT DOCUMENTS

| | | | | |
|---|---|---|---|---|
| 2,480,737 A * | 8/1949 | Jayle | ...................... | A61F 9/013 606/166 |
| 2,880,810 A * | 4/1959 | Tolomeo | ................. | B64C 27/50 244/17.11 |
| 3,083,645 A * | 4/1963 | Donner | ..................... | F04C 2/14 418/74 |
| 3,726,801 A * | 4/1973 | Sterner et al. | ........... | B66D 1/08 60/435 |

\* cited by examiner

*Primary Examiner* — Thomas C Diaz
(74) *Attorney, Agent, or Firm* — Bradley Arant Boult Cummings LLP

(57) ABSTRACT

A spring-loaded cap mechanism includes an annular cap having a rotational axis and adapted to bear against a drive-shaft adapter and a spring positioned opposite the drive-shaft adapter and that axially biases the annular cap in a linear direction against the drive-shaft adapter responsive to engagement of the drive-shaft adapter with the annular cap.

18 Claims, 8 Drawing Sheets

SELF-SEALING GEARS ASSEMBLY WITH ADAPTER

STATEMENT REGARDING FEDERALLY SPONSORED RESEARCH OR DEVELOPMENT

This invention was made with Government support under Agreement No. W911W6-19-9-0002, awarded by the Army Contracting Command-Redstone Arsenal. The Government has certain rights in the invention.

TECHNICAL FIELD

This disclosure relates in general to driveshaft and gearbox connections, and more particularly, but not by way of limitation, to protecting gearbox components from exposure to an ambient environment that can increase chances of corrosion of the gearbox components.

BACKGROUND

This section provides background information to facilitate a better understanding of the various aspects of the disclosure and the statements in this section are to be read in this light, and not as admissions of prior art.

A splined adapter is a common interface for connecting a driveshaft to a gearbox. For splined adapters that are not clamped, an oil lubrication path is often designed to flow over teeth of a spline of the gearbox and the splined adapter in order to reduce wear. Such an oil path typically prevents an exposed end of internal gearbox components from being sealed off from the ambient environment since there will need to be an internal oil-in point and an oil-out point.

In a conventional design, removing the splined adapter exposes various internal components of the gearbox to the ambient environment. As such, a risk of corrosion to gearbox components significantly increases if the exposed end of the gearbox is not capped off. In some aircraft designs such as helicopters, a tail rotor output spline is difficult to reach in order to place a temporary service cap.

SUMMARY

A spring-loaded cap mechanism includes an annular cap having a rotational axis and adapted to bear against a drive-shaft adapter and a spring positioned opposite the drive-shaft adapter and that axially biases the annular cap in a linear direction against the drive-shaft adapter responsive to engagement of the drive-shaft adapter with the annular cap.

A gear assembly includes a gear, a drive-shaft adapter rotationally coupled to the gear to drive a drive shaft, and a spring-loaded cap mechanism bounded by the gear and operable to bear axially against the drive-shaft adapter.

A method of sealing internal components of a gear includes inserting a drive-shaft adapter axially into an output gear, the drive-shaft adapter bearing against a spring-loaded cap mechanism, responsive to the drive-shaft adapter bearing, the spring-loaded cap mechanism exerting axial force against the drive-shaft adapter, exposing an oil path inside the output gear and the drive-shaft adapter, responsive to removing of the drive-shaft adapter, the spring-loaded cap mechanism exerting axial force against a shoulder formed on an internal surface of the gear and sealing the oil path from an ambient environment.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying Figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1A:
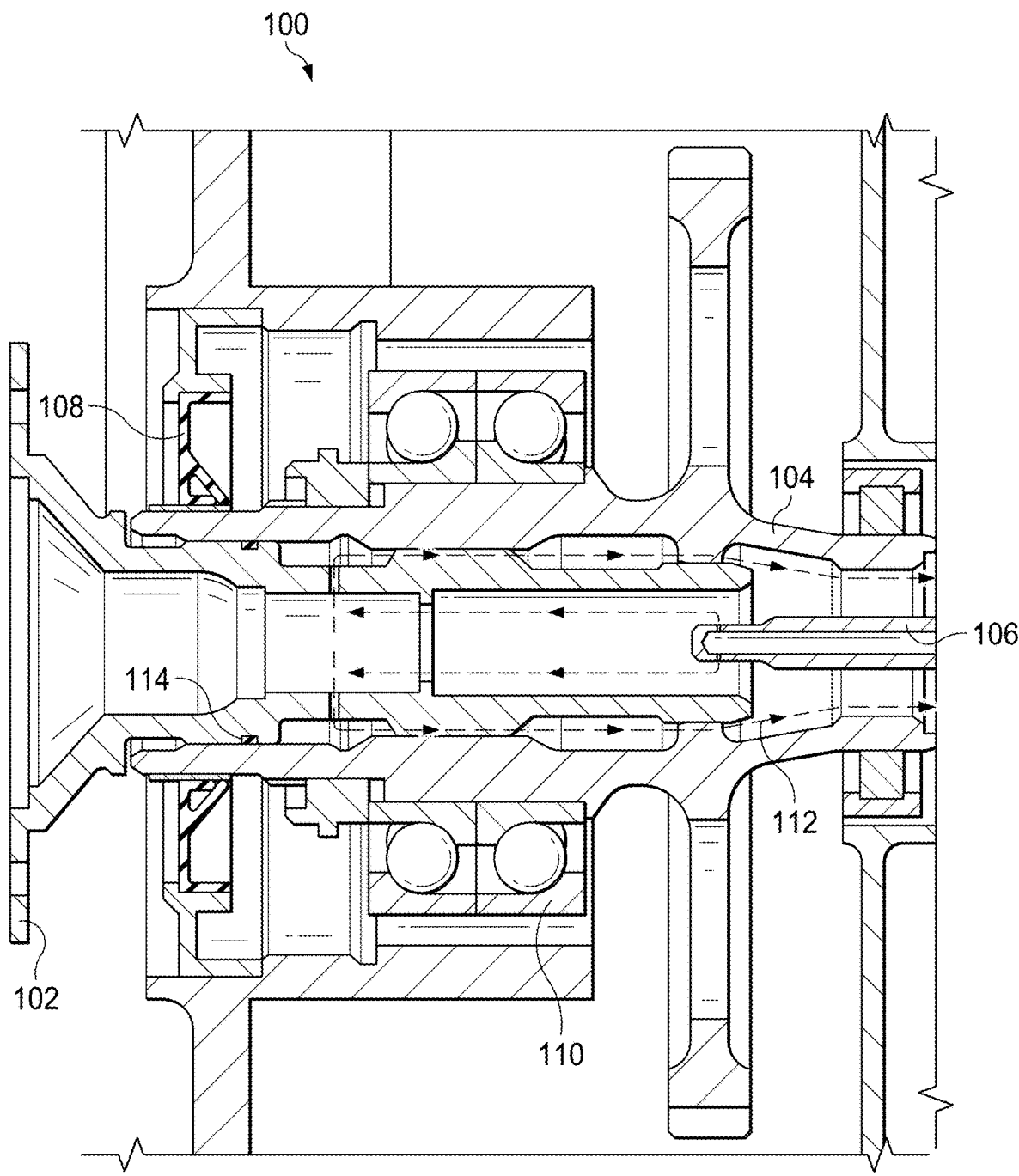
FIG. 1A is a partial cross-sectional view of an illustrative gear assembly that includes a drive-shaft adapter.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

In a typical embodiment, a spring-loaded cap is employed to allow for lubrication of a splined adapter. The cap is operable to mechanically seal an exposed end of a gearbox and oil jet when the splined adapter has been disengaged from the gearbox. The cap serves to protect the internal components of the gearbox from the ambient environment to which the internal components would otherwise be exposed. the spring-loaded cap may be made, for example, of one or more metallic, composite, and engineering-polymer materials. An internal bearing and seal may be included in the construction of the spring-loaded cap in order to isolate rotating components from non-rotating components of the gearbox. The spring-loaded cap may be a single piece that has its inner surface under-race lubricated to reduce friction during rotational operation. The spring-loaded cap may in some embodiments ride on the oil jet.

FIG. 1A is a partial cross-sectional view of an illustrative gear assembly that includes a drive-shaft adapter. A gear assembly 100 as shown includes a drive-shaft adapter 102 splined into a tail-rotor output gear 104. Although a tail-rotor output gear 104 of an aircraft (not shown) is illustrated, principles disclosed herein can be applied to other types of gears other than tail-rotor gears. The gear assembly 100 also includes an oil jet 106 arranged internally to both the tail-rotor output gear 104 and the drive-shaft adapter 102. The oil jet 106 lubricates components of the gear assembly 100 as outlined in more detail below. In a typical embodiment, the drive-shaft adapter 102 rotationally couples the tail-rotor output gear 104 to a drive shaft (not shown) and the oil jet 106 does not rotate. The drive-shaft adapter 102 and the drive shaft may be separate components or integral to one another.

The gear assembly 100 includes a seal 108 and a bearing 110. The bearing 110 is illustrated as a ball bearing, although other types of suitable bearings may be employed. An oil path 112 from the oil jet 106 into an interior surface of the drive-shaft adapter 102 to spaces between the drive-shaft adapter 102 and the tail-rotor output gear 104 and then to a gear box (not shown) to which the tail-rotor output gear 104 is connected is also illustrated. An O-ring 114 seals an interface between an external surface of the drive-shaft adapter 102 and an internal surface of the tail-rotor output gear 104 and serves to contain oil from the oil jet 106.

Figure 1B:
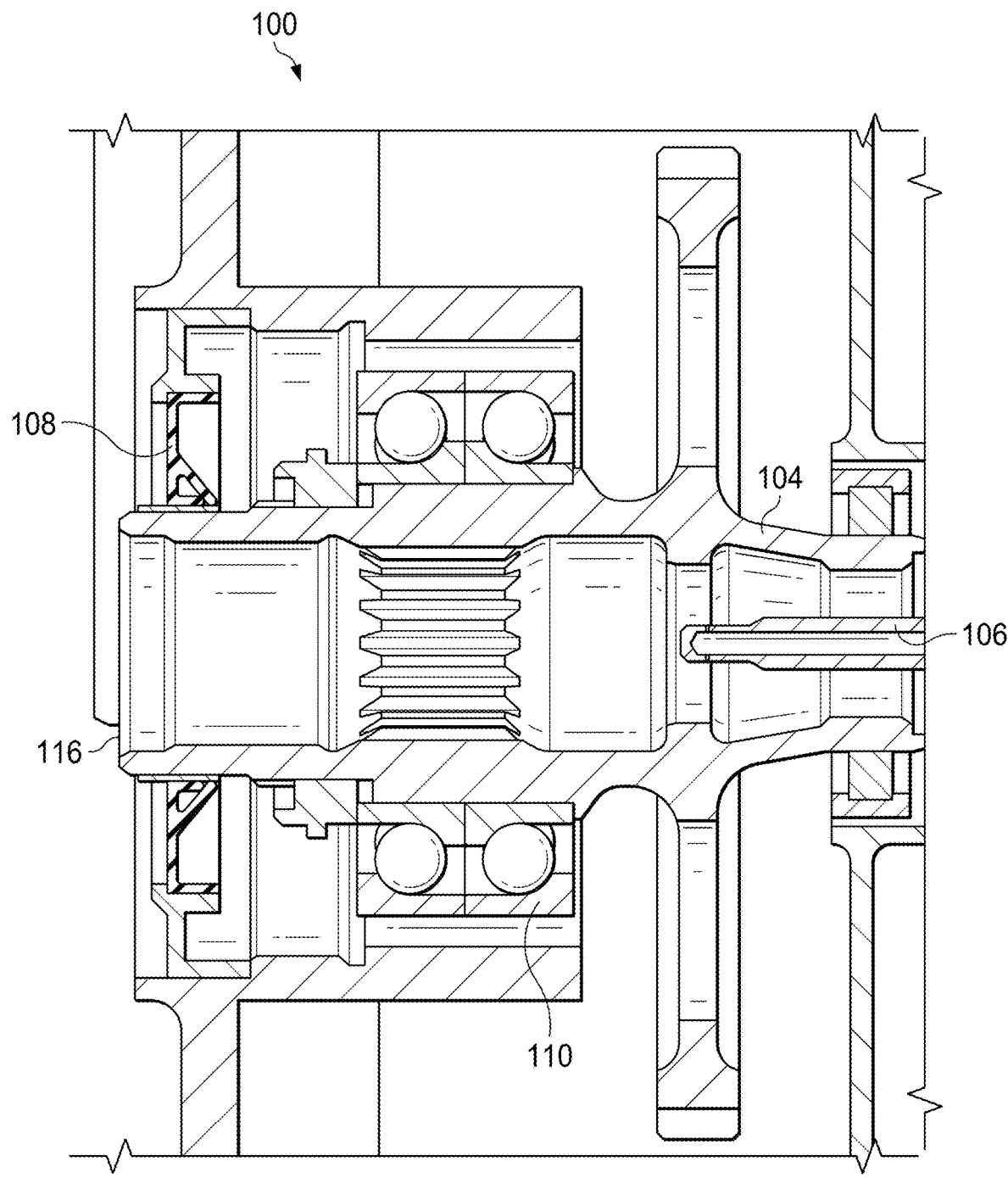
FIG. 1B is a partial cross-sectional view of the illustrative gear assembly of FIG. 1A after the drive-shaft adapter has been removed.

FIG. 1B is a partial cross-sectional view of the illustrative gear assembly of FIG. 1A after the drive-shaft adapter 102 has been removed. After the drive-shaft adapter 102 has been removed from the gear assembly 100, various internal surfaces of the gear assembly 100, including the oil jet 106 and the tail-rotor output gear 104 are exposed to the ambient environment, which exposure can lead to corrosion. While one potential solution would be to place a cover over an exposed portion 116 of the tail-rotor output gear 104, in some configurations, accessing the exposed portion 116 can be infeasible. Even if the exposed portion 116 is accessible, it would be necessary for personnel to remember to place a cover on the exposed portion 116 after the drive-shaft adapter 102 has been removed.

Figure 2A:
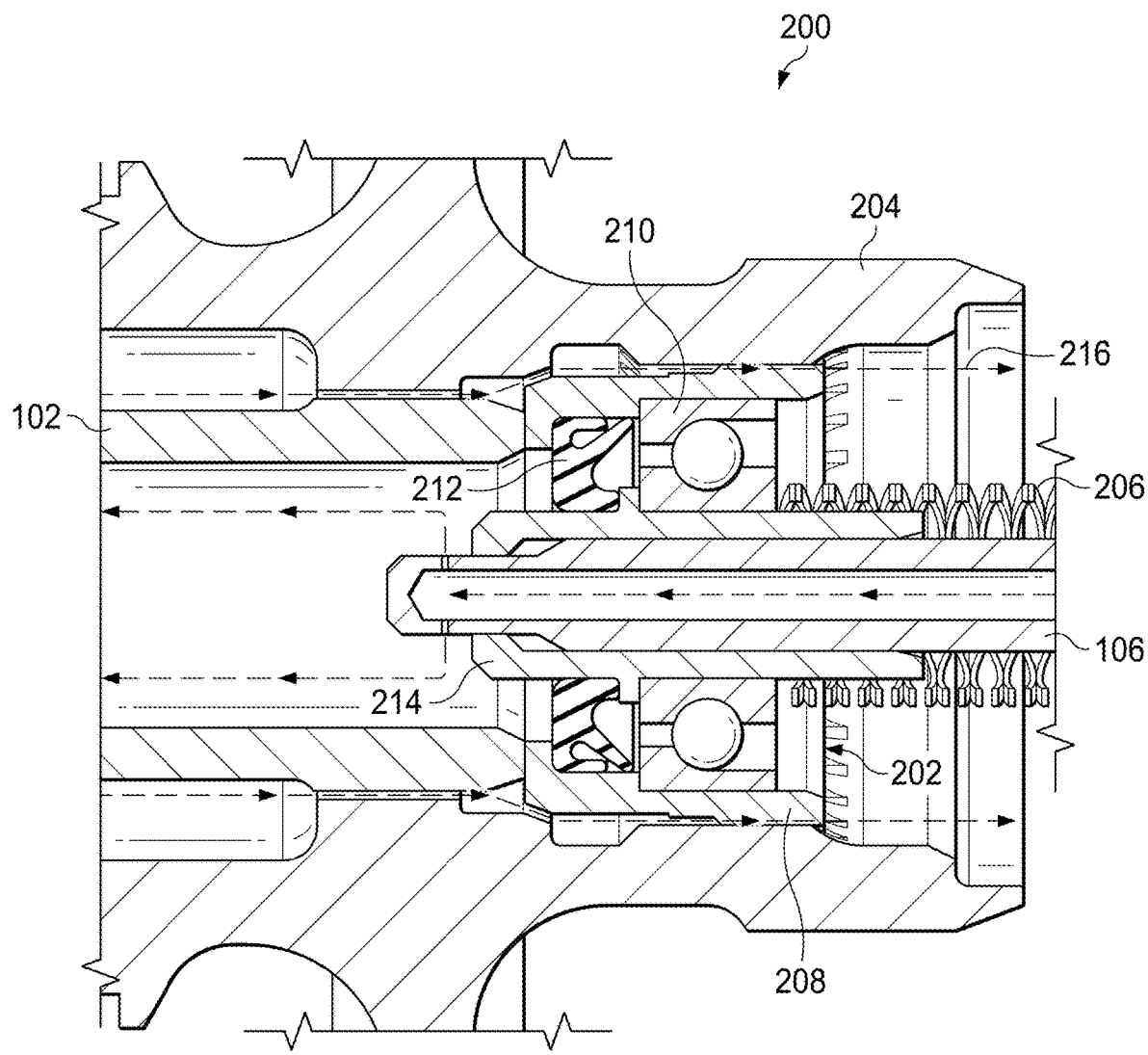
FIG. 2A is a cross-sectional view of an illustrative gear assembly that includes a drive-shaft adapter and a spring-loaded cap that includes a bearing.

FIG. 2A is a cross-sectional view of an illustrative gear assembly that includes an adapter and a spring-loaded cap mechanism that includes a bearing. In FIG. 2A, a gear assembly 200 includes the drive-shaft adapter 102, a spring-loaded cap mechanism 202, a tail-rotor output gear 204, and the oil jet 106. The spring-loaded cap mechanism 202 surrounds a circumference of the oil jet 106 along at least a part of a length thereof while leaving oil outputs thereof exposed and includes a spring 206 that biases the spring-loaded cap mechanism 202 against the drive-shaft adapter 102. An oil path 216 is illustrated by arrows so designated. The spring-loaded cap mechanism 202 also includes an outer cap 208, a leading surface of which bears against a corresponding leading face of the drive-shaft adapter 102, a bearing 210, a seal 212, and an inner cap 214. The bearing 210 and the seal 212 are generally annular in shape, surround a circumference of the inner cap 214 along at least a portion of the length thereof, and are bounded by an inner circumference of the outer cap 208. The bearing 210 permits the inner cap 214 and the spring 206 to remain rotationally stationary and the outer cap 208 and the seal 212 to rotate with the tail-rotor output gear 204. Various components of the spring-loaded cap mechanism 202 may be made in whole or in part of metallic, composite, or engineering polymer materials. Although the inner cap 214 of the spring-loaded cap mechanism 202 as shown rides on the oil jet 106, this need not necessarily be the case in all embodiments.

Figure 2B:
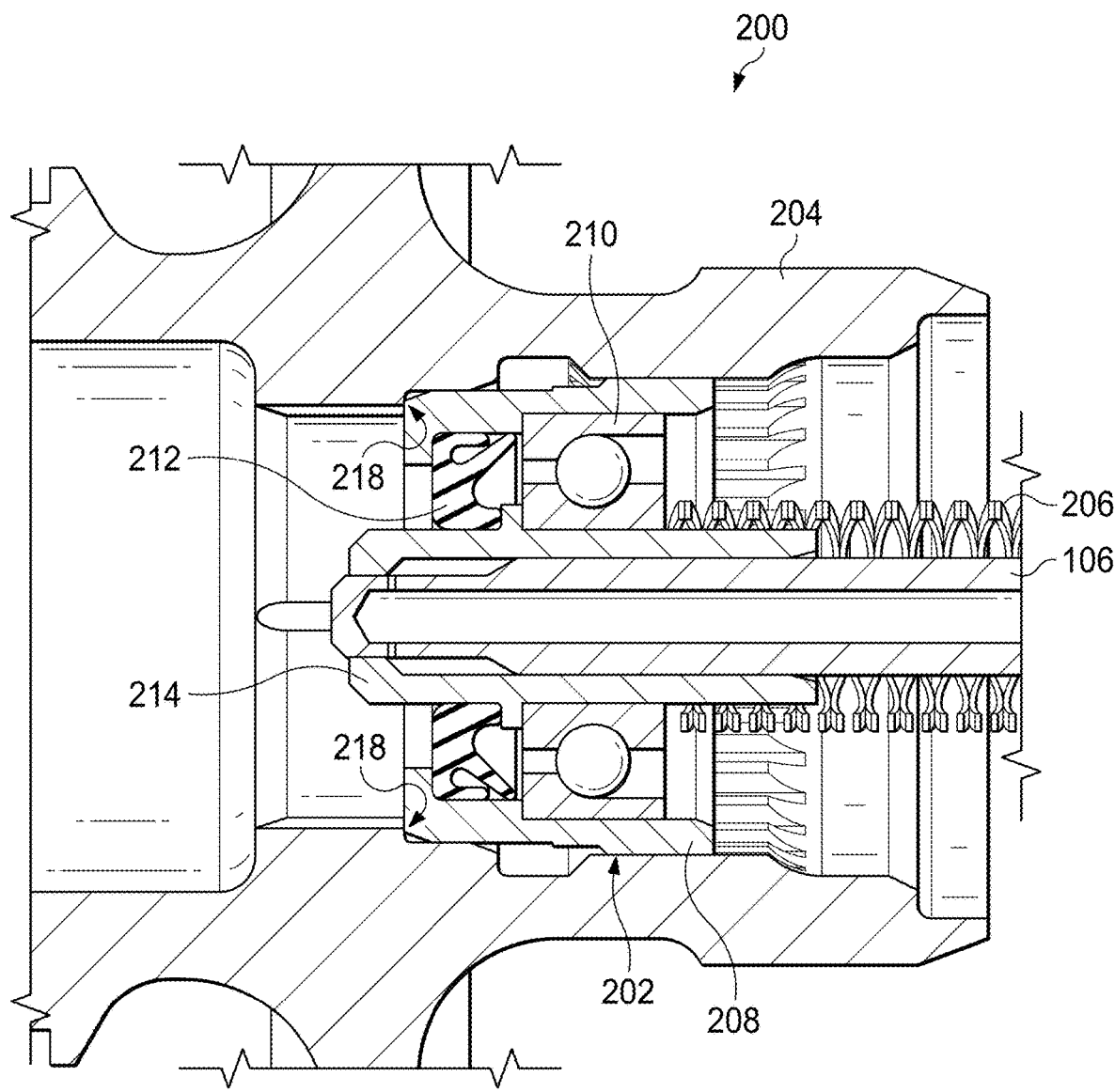
FIG. 2B is a cross-sectional view of the gear assembly of FIG. 2A after the drive-shaft adapter has been removed.

FIG. 2B is a cross-sectional view of the gear assembly of FIG. 2A after the drive-shaft adapter 102 has been removed. Upon removal of the drive-shaft adapter 102, the spring 206 serves to urge a leading face of the spring-loaded cap mechanism 202 a shoulder 218 formed in an inner surface of the tail-rotor output gear 204 such that a sealing surface is formed between the outer cap 208 and the shoulder 218. In similar fashion, the inner cap 214 covers outputs of the oil jet 106, thereby forming a seal against the outputs. As such, various internal components of the gear assembly 200 are sealed against exposure to an ambient environment that could lead to corrosion thereof.

Figure 3A:
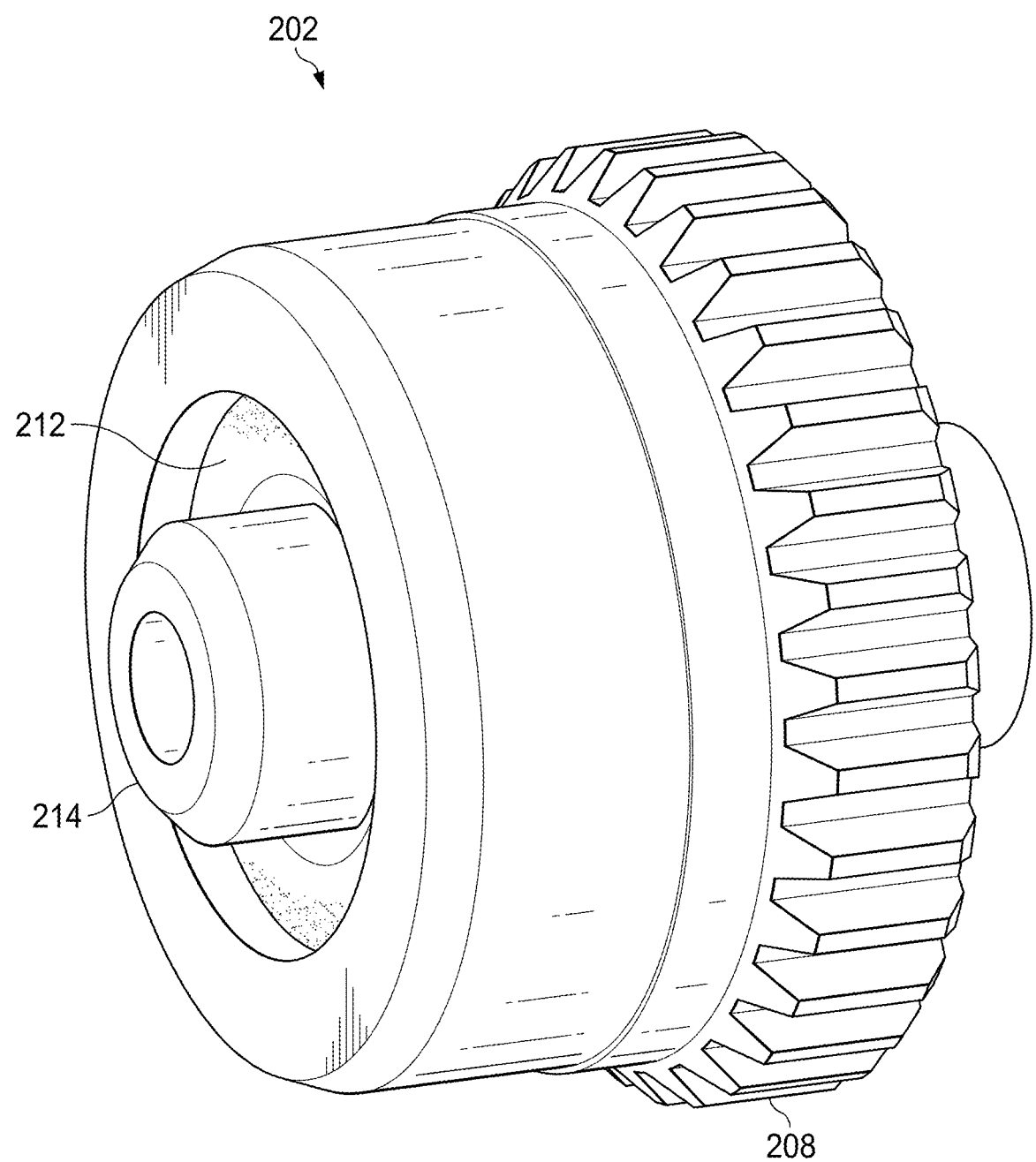
FIG. 3A is a perspective view of a spring-loaded cap that can be used with the gear assembly shown in FIGS. 2A-B.
Figure 3B:
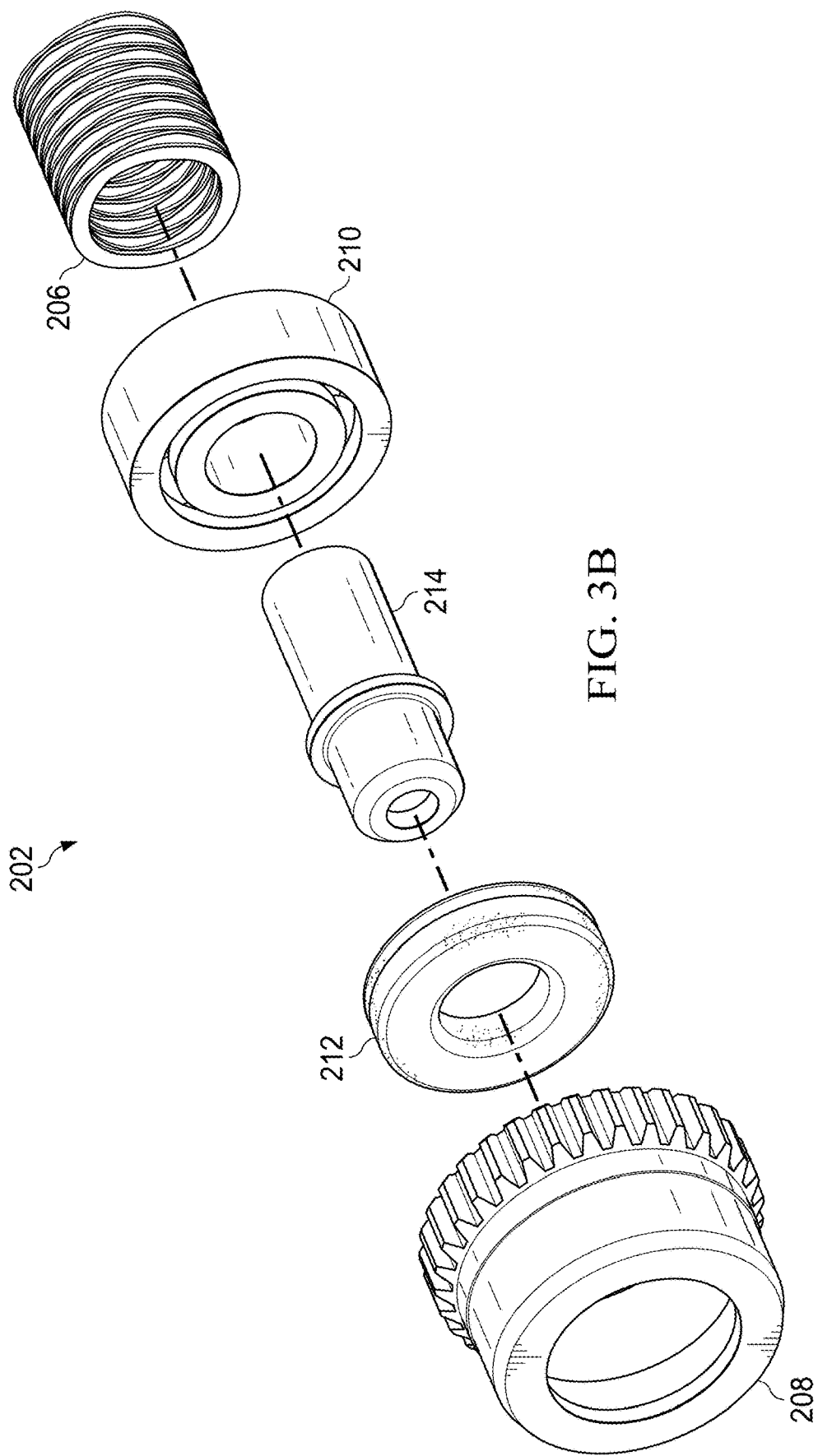
FIG. 3B is an exploded perspective view of the spring-loaded cap of FIG. 3A.
Figure 4:
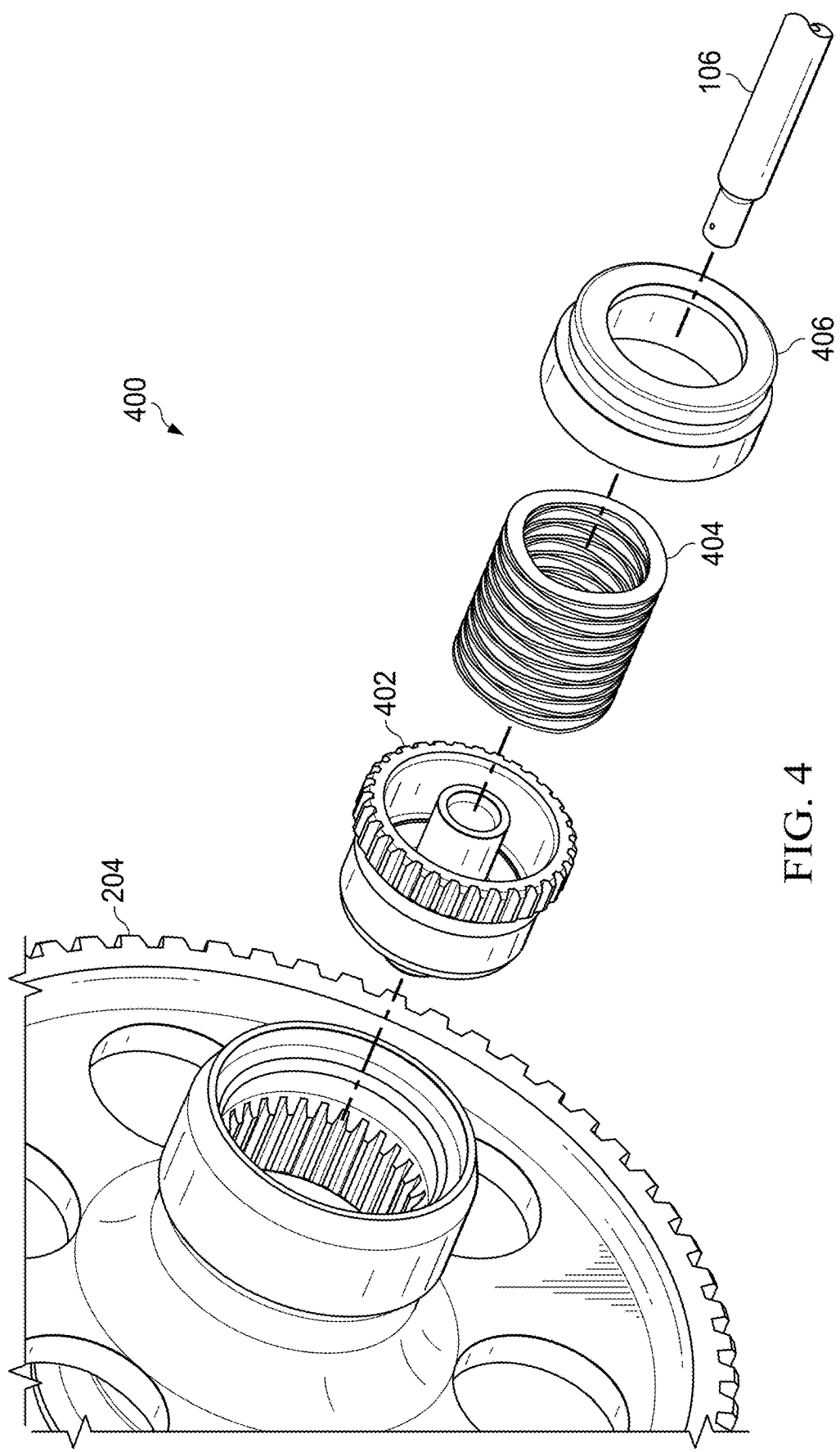
FIG. 4 is an exploded perspective view of a spring-loaded cap that includes a captured spring.

FIG. 3A is a perspective view of the spring-loaded cap mechanism shown in FIGS. 2A-B. FIG. 3B is an exploded perspective view of the spring-loaded cap of FIG. 3A; FIG. 4 is an exploded perspective view of a spring-loaded cap mechanism that includes a captured spring rather than a bearing. In FIG. 4, a spring-loaded cap mechanism 400 mates with the tail-rotor output gear 204. The spring-loaded cap mechanism 400 includes a cap 402, a spring 404, and a nut 406. The oil jet 106 is also shown. The spring 404 is held in place by the cap 402 and the nut 406, as will be described in more detail relative to FIG. 5.

Figure 5:
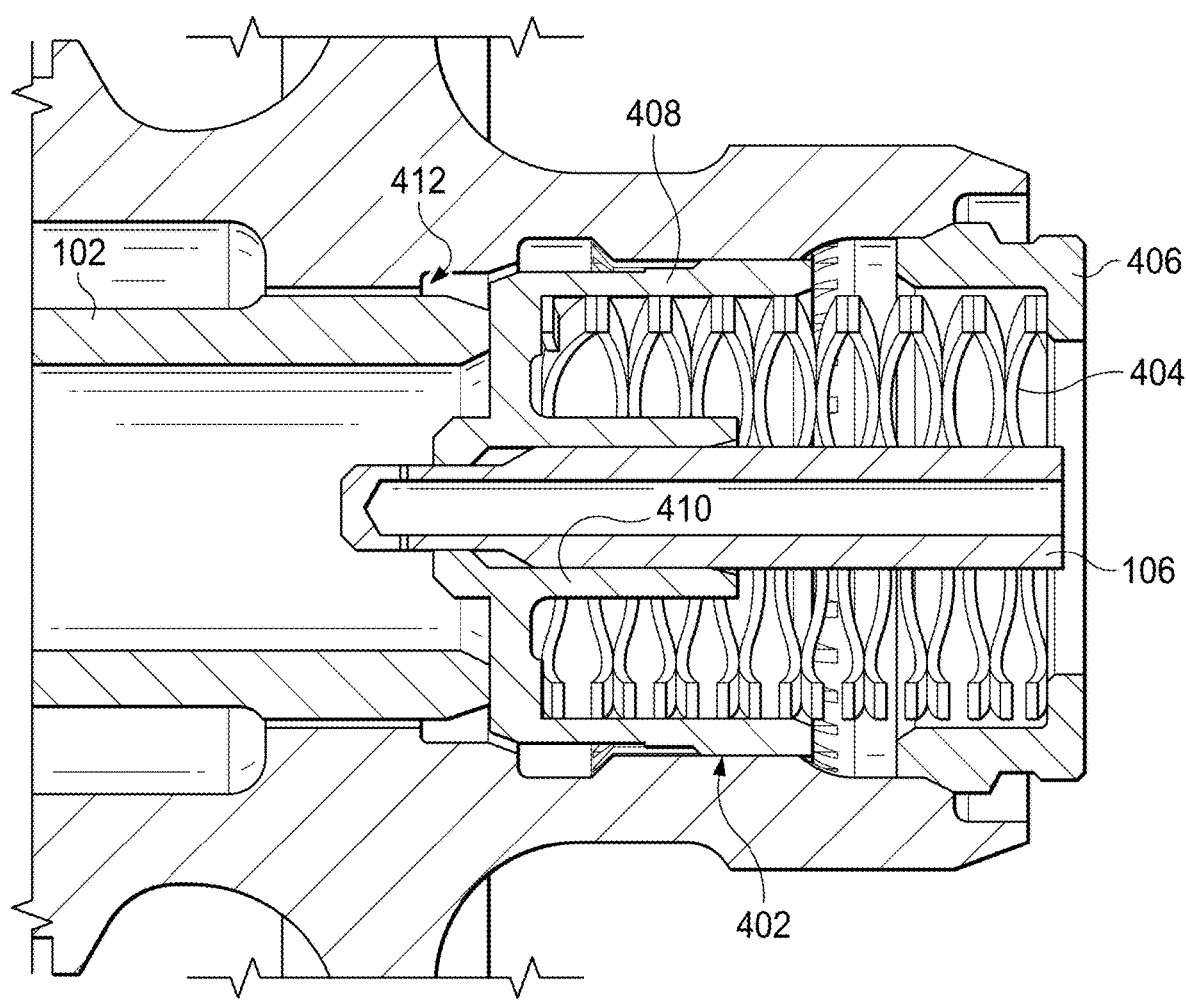
FIG. 5 is a cross-sectional view of an illustrative gear assembly that includes the spring-loaded cap of FIG. 4.

FIG. 5 is a cross-sectional view of an illustrative gear assembly that includes the spring-loaded cap mechanism of FIG. 4. The spring-loaded cap mechanism 400 bears against the drive-shaft adapter 102 in similar fashion to the embodiment discussed above relative to FIGS. 2A-B. However, the cap 402 is unitary in nature and having formed therein an outer ring 408 and an inner ring 410 in concentric relation to one another, the outer ring in fixed contact with an inner surface of the tail-rotor output gear 204 and the inner ring 410 in sliding contact with the oil jet 106. The nut 406, the spring 404, and the cap 402 rotate with the tail-rotor output gear 204, while the oil jet does not so rotate. In some embodiments, a surface one or both of the inner ring 410 and the oil jet 106 may be formed of a material or coated so as to facilitate low-friction sliding engagement therebetween. Upon removal of the drive-shaft adapter 102, the spring-loaded cap mechanism reacts in similar fashion to that discussed above relative to FIGS. 2A-B to seal against shoulder 412 and also to seal oil outputs of the oil jet 106.

Although relative terms such as "outer," "outboard," "inner," "inboard," "upper," "lower," and similar terms have been used herein to describe a spatial relationship of one element to another, it is understood that these terms are intended to encompass different orientations of the various elements and components in addition to the orientation depicted in the figures. Furthermore, as used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements. The terms "substantially," "approximately," "generally," and "about" are defined as largely but not necessarily wholly what is specified (and includes what is specified; e.g., substantially 90 degrees includes 90 degrees and substantially parallel includes parallel), as understood by a person of ordinary skill in the art.

The extent to which the description may vary will depend on how great a change can be instituted and still have a person of ordinary skill in the art recognized the modified feature as still having the required characteristics and capabilities of the unmodified feature.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A spring-loaded cap mechanism comprising:
   an annular cap having a rotational axis and adapted to bear against a drive-shaft adapter; and
   a spring positioned opposite the drive-shaft adapter and that axially biases the annular cap in a linear direction against the drive-shaft adapter responsive to engagement of the drive-shaft adapter with the annular cap;
   wherein the spring axially biases the annular cap in the linear direction against a shoulder of a gear bounding the annular cap responsive to disengagement of the drive-shaft adapter from the annular cap, thereby sealing components of the gear from an ambient environment.

2. The spring-loaded cap mechanism of claim 1, comprising:
   an inner annular cap;
   wherein the annular cap is an outer annular cap; and
   wherein the inner annular cap and the outer annular cap are concentric relative to one another and are each rotatable about the rotational axis.

3. The spring-loaded cap mechanism of claim 2, comprising:
   a concentric bearing rotatable about the rotational axis and positioned between the inner annular cap and the outer annular cap;
   wherein the concentric bearing permits the outer annular cap to rotate with a gear mated with the outer annular cap and the inner annular cap to remain rotationally stationary relative to the gear.

4. The spring-loaded cap mechanism of claim 2, wherein:
   an inner surface of the inner annular cap contacts an oil jet;
   the inner annular cap exposes an oil output of the oil jet responsive to the drive-shaft adapter disengaging from the outer annular cap; and
   the inner annular cap covers the oil output responsive to the drive-shaft adapter disengaging from the outer annular cap.

5. The spring-loaded cap mechanism of claim 1, comprising:
   wherein the annular cap is unitary in structure and has formed therein an outer ring and an inner ring, the inner ring and the outer ring being concentric relative to one another;
   a nut; and
   wherein the spring is held in place on one end by the annular cap and on a second end by the nut.

6. The spring-loaded cap mechanism of claim 5, wherein the spring axially biases the annular cap in the linear direction against a shoulder of a gear bounding the annular cap responsive to disengagement of the drive-shaft adapter from the annular cap, thereby sealing components of the gear from an ambient environment.

7. The spring-loaded cap mechanism of claim 6, wherein the annular cap and the spring rotate with the ring about the rotational axis.

8. The spring-loaded cap mechanism of claim 6, wherein:
   an inner surface of the inner ring contacts an oil jet;
   the inner ring exposes an oil output of the oil jet responsive to the drive-shaft adapter engaging the outer ring; and
   the inner ring covers the oil output responsive to the drive-shaft adapter disengaging from the outer ring.

9. The spring-loaded cap mechanism of claim 1, wherein the drive-shaft adapter and a drive shaft connected thereto are integral with one another.

10. A gear assembly comprising:
    a gear;
    a drive-shaft adapter rotationally coupled to the gear to drive a drive shaft; and
    a spring-loaded cap mechanism bounded by the gear and operable to bear axially against the drive-shaft adapter;
    wherein the gear comprises a shoulder and, responsive to disengagement of the drive-shaft adapter from the spring-loaded cap mechanism, a leading face of the spring-loaded cap mechanism seals components of the gear from an ambient environment.

11. The gear assembly of claim 10, comprising:
    an oil jet;
    wherein the spring-loaded cap mechanism exposes an oil output of the oil jet responsive to the drive-shaft adapter engaging the spring-loaded cap mechanism; and
    wherein the spring-loaded cap mechanism covers the oil output responsive to the drive-shaft adapter disengaging from the spring-loaded cap mechanism.

12. The gear assembly of claim 11, wherein the spring-loaded cap mechanism comprises:
    an inner cap operable to rotate about a rotational axis of the drive-shaft adapter;
    an outer cap concentric with the inner cap;
    a bearing positioned between the inner cap and the outer cap;
    a spring in contact with the inner cap; and
    an annular seal that seals a gap between the outer cap and the inner cap adjacent a leading face of the outer cap.

13. The gear assembly of claim 10, wherein the spring-loaded cap mechanism comprises:
    a unitary cap comprising an outer ring and an inner ring concentric to the outer ring;
    a spring in contact on a first side thereof with the unitary cap on a side opposite the drive-shaft adapter and operable to bias axially the spring-loaded cap mechanism; and
    a nut in contact with a second side of the spring and operable to retain the spring;

wherein the spring biases the spring-loaded cap mechanism toward the drive-shaft adapter.

14. A method of sealing internal components of a gear, the method comprising:
- inserting a drive-shaft adapter axially into an output gear;
- the drive-shaft adapter bearing against a spring-loaded cap mechanism;
- responsive to the drive-shaft adapter bearing, the spring-loaded cap mechanism exerting axial force against the drive-shaft adapter, exposing an oil path inside the output gear and the drive-shaft adapter; and
- responsive to removing of the drive-shaft adapter, the spring-loaded cap mechanism exerting axial force against a shoulder formed on an internal surface of the gear and sealing the oil path from an ambient environment.

15. The method of claim 14, wherein the spring-loaded cap mechanism comprises:
- an inner cap operable to rotate about a rotational axis of the drive-shaft adapter;
- an outer cap concentric with the inner cap;
- a bearing positioned between the inner cap and the outer cap;
- a spring in contact with the inner cap; and
- an annular seal that seals a gap between the outer cap and the inner cap adjacent a leading face of the outer cap.

16. The method of claim 14, wherein:
the output gear comprises an oil jet;
responsive to the drive-shaft adapter bearing, the spring-loaded cap mechanism exposing an oil output of the oil jet; and
responsive to removing, the spring-loaded cap mechanism covering the oil output.

17. The method of claim 16, wherein the spring-loaded cap mechanism comprises:
- an annular cap that is unitary in structure and has formed therein an outer ring and an inner ring, the inner ring and the outer ring being concentric relative to one another;
- a nut; and
- wherein the spring is held in place on one end by the annular cap and on a second end by the nut.

18. The method of claim 16, wherein the spring-loaded cap mechanism comprises:
- a unitary cap comprising an outer ring and an inner ring concentric to the outer ring;
- a spring in contact on a first side thereof with the unitary cap on a side opposite the drive-shaft adapter and operable to bias axially the spring-loaded cap mechanism; and
- a nut in contact with a second side of the spring and operable to retain the spring;
- wherein the spring biases the spring-loaded cap mechanism toward the drive-shaft adapter.

* * * * *